United States Patent
Xu et al.

(10) Patent No.: US 10,210,982 B1
(45) Date of Patent: Feb. 19, 2019

(54) COMMON-MODE CHOKE FOR PARALLELED POWER SEMICONDUCTOR WITH INTEGRATED CURRENT SENSOR

(71) Applicant: FORD GLOBAL TECHNOLOGIES, LLC, Dearborn, MI (US)

(72) Inventors: Fan Xu, Novi, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/966,735

(22) Filed: Apr. 30, 2018

(51) Int. Cl.
| | |
|---|---|
| H03K 3/01 | (2006.01) |
| H01F 17/04 | (2006.01) |
| H02M 1/088 | (2006.01) |
| H02M 7/00 | (2006.01) |
| H01F 38/14 | (2006.01) |
| H01F 17/00 | (2006.01) |

(52) U.S. Cl.
CPC ............ *H01F 17/04* (2013.01); *H01F 38/14* (2013.01); *H02M 1/088* (2013.01); *H02M 7/003* (2013.01); *H01F 2017/0093* (2013.01)

(58) Field of Classification Search
CPC .... H02M 3/1584; H02M 7/003; H02M 1/088; H01F 7/0093; H01F 38/14; G01R 51/185
USPC .......... 363/16, 65, 70, 71–76; 361/143, 146, 361/149; 336/83, 192, 178, 212, 215
See application file for complete search history.

(56) References Cited

U.S. PATENT DOCUMENTS

| | | | | |
|---|---|---|---|---|
| 6,590,786 | B2 * | 7/2003 | Gurov | H02M 3/33592 363/16 |
| 7,443,146 | B2 * | 10/2008 | Wei | H02M 3/1584 323/224 |
| 7,969,208 | B2 | 6/2011 | Jansen | |
| 8,487,604 | B2 * | 7/2013 | Ikriannikov | H01F 3/10 323/355 |
| 9,691,538 | B1 * | 6/2017 | Ikriannikov | H01F 3/10 |
| 2014/0152350 | A1 * | 6/2014 | Ikriannikov | H03K 17/0412 327/109 |
| 2017/0104419 | A1 | 4/2017 | Zeng et al. | |
| 2017/0302189 | A1 | 10/2017 | Jakob et al. | |

FOREIGN PATENT DOCUMENTS

| | | |
|---|---|---|
| EP | 2466751 A1 | 6/2012 |
| EP | 2819285 A1 | 12/2014 |

* cited by examiner

*Primary Examiner* — Rajnikant Patel
(74) *Attorney, Agent, or Firm* — David Kelley; Brooks Kushman P.C.

(57) ABSTRACT

A power module includes power switching devices that are electrically coupled in parallel to increase current capacity. The paralleled power switching devices are triggered by a common gate signal. Each of the power switching devices include a gate terminal, a current-sense terminal, and a Kelvin source/emitter terminal. The power module includes a plurality of magnetically coupled windings coupling the gate terminal, the current-sense terminal and the Kelvin source/emitter terminal of each of the switching devices to a gate driver circuit.

20 Claims, 6 Drawing Sheets

COMMON-MODE CHOKE FOR PARALLELED POWER SEMICONDUCTOR WITH INTEGRATED CURRENT SENSOR

TECHNICAL FIELD

This application generally relates to a common-mode choke circuit integrated with a power semiconductor module.

BACKGROUND

Hybrid-electric and electric vehicles use electrical energy for propulsion. To convert the electrical energy, power semiconductors are used. The power semiconductors are rated to carry a predetermined amount of current. In a typical application, power semiconductors are selected to carry more current than may be necessary. As current demand increases, the cost of the power semiconductors may increase. Further, as the current demand increases, additional thermal controls may be needed to maintain the power semiconductors within specified operating temperatures.

SUMMARY

A power module includes a plurality of switching devices electrically coupled in parallel and triggered by a common gate signal, each including a gate terminal, a current-sense terminal, and a Kelvin source/emitter terminal. The power module further includes a plurality of magnetically coupled windings coupling the gate terminal, the current-sense terminal and the Kelvin source/emitter terminal of each of the switching devices to a gate driver circuit.

A number of turns of each of the magnetically coupled windings may be equal. The current-sense terminal and the Kelvin source/emitter terminal may be coupled together. An inductance of each of the magnetically coupled windings may be greater than a stray inductance in an associated connection. A first of the magnetically coupled windings may be electrically connected between the gate terminal and the gate driver circuit, a second of the magnetically coupled windings may be electrically connected between the current-sense terminal and the gate driver circuit, and a third of the magnetically coupled windings may be electrically connected between the Kelvin source/emitter terminal and the gate driver circuit. A voltage drop across one of the magnetically coupled windings may induce an equivalent voltage drop across remaining magnetically coupled windings.

A power module includes a plurality of switching devices triggered by a common gate signal, electrically coupled in parallel between an electric machine winding and a battery terminal, and attached to a substrate that includes first, second, and third traces formed around a common axis to define a common mode choke that magnetically couples a gate path, a current-sense path, and a Kelvin source/emitter path of each of the switching devices.

One of the first, second, and third traces may form a coil in the gate path that connects a gate input of the switching devices to the common gate signal. One of the first, second, and third traces may form a coil in the Kelvin source/emitter path that connects a Kelvin source/emitter output of the switching devices to a common control signal. One of the first, second, and third traces may form a coil in the current-sense path that connects a current-sense output of the switching devices to a common control signal. A number of turns of the first, second, and third traces may be equal. The power module may further include a magnetic core inserted at a central position defined by the first, second, and third traces. The first, second, and third traces may be formed as copper traces on respective planes of the substrate. The first, second, and third traces may be formed in a same layer of the substrate. The first, second, and third traces may be formed in different layers of the substrate.

A vehicle includes an electric machine and an inverter comprising a plurality of switching devices triggered by a common gate signal and electrically coupled in parallel between an electric machine winding and a battery terminal and a common mode choke associated with each of the switching devices magnetically coupling a gate circuit, a current-sense circuit, and a Kelvin source/emitter circuit associated with the switching devices.

Inductances associated with each coil of the common mode choke may have an equivalent inductance value. The common mode choke may be configured such that a voltage drop across a winding of the common mode choke induces an equivalent voltage drop across other windings of the common mode choke. The common mode choke may be formed as a plurality of concentric traces on a substrate around a common axis. The common mode choke may be formed as a plurality of traces, each formed around a common axis on a different layer of a substrate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
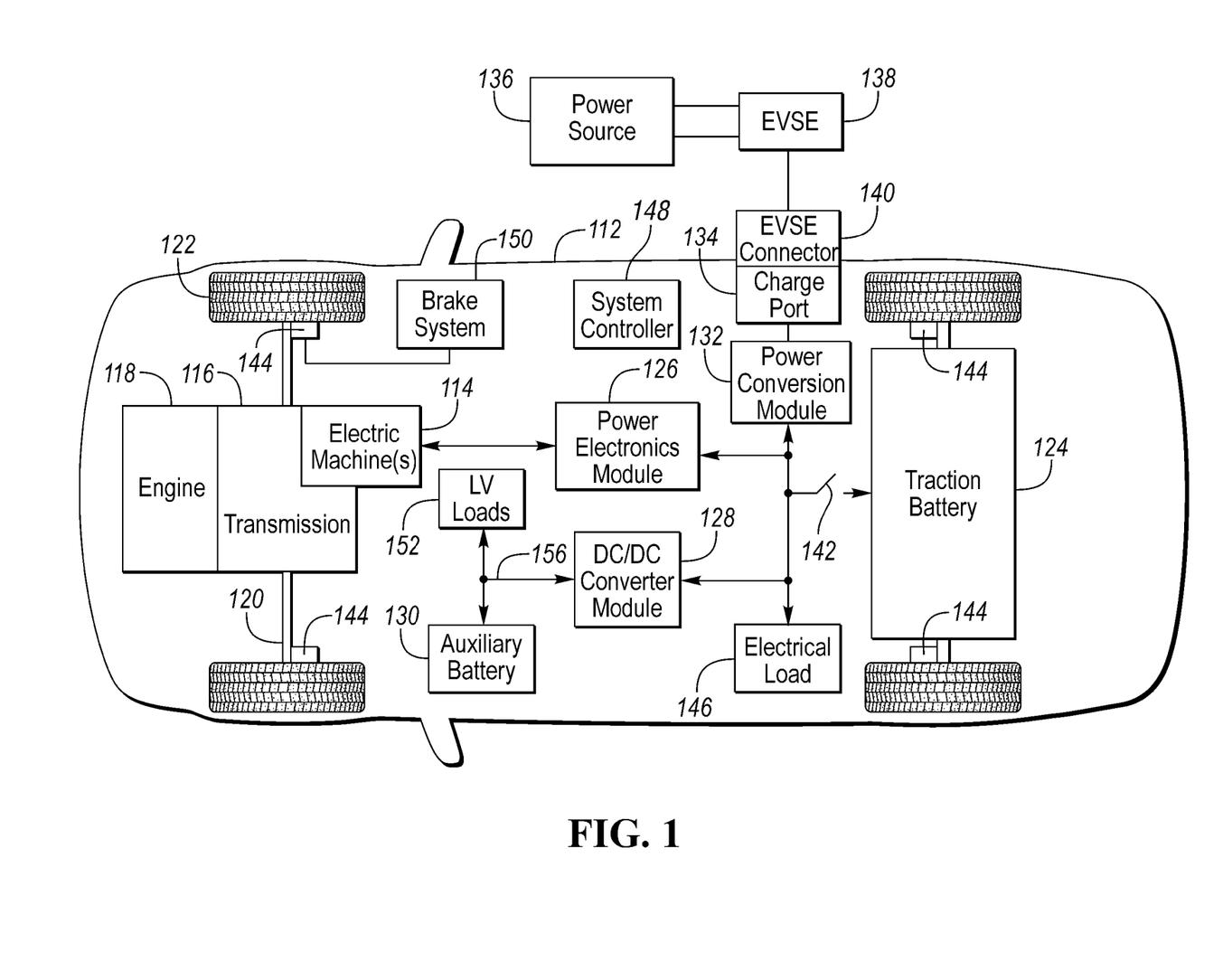
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (may also be referred to as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads 152. An output of the DC/DC converter module 128 may be electrically coupled to an auxiliary battery 130 (e.g., 12V battery) for charging the auxiliary battery 130. The low-voltage systems 152 may be electrically coupled to the auxiliary battery 130 and the output of the DC/DC converter module 128 via a low-voltage bus 156. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

In some configurations, the electrified vehicle 112 may be configured to provide power to an external load. For example, the electrified vehicle may be configured to operate as a back-up generator or power outlet. In such applications, a load may be connected to the EVSE connector 140 or other outlet. The electrified vehicle 112 may be configured to return power to the power source 136. For example, the electrified vehicle 112 may be configured to provide alternating current (AC) power to the electrical grid. The voltage supplied by the electrified vehicle may be synchronized to the power line.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
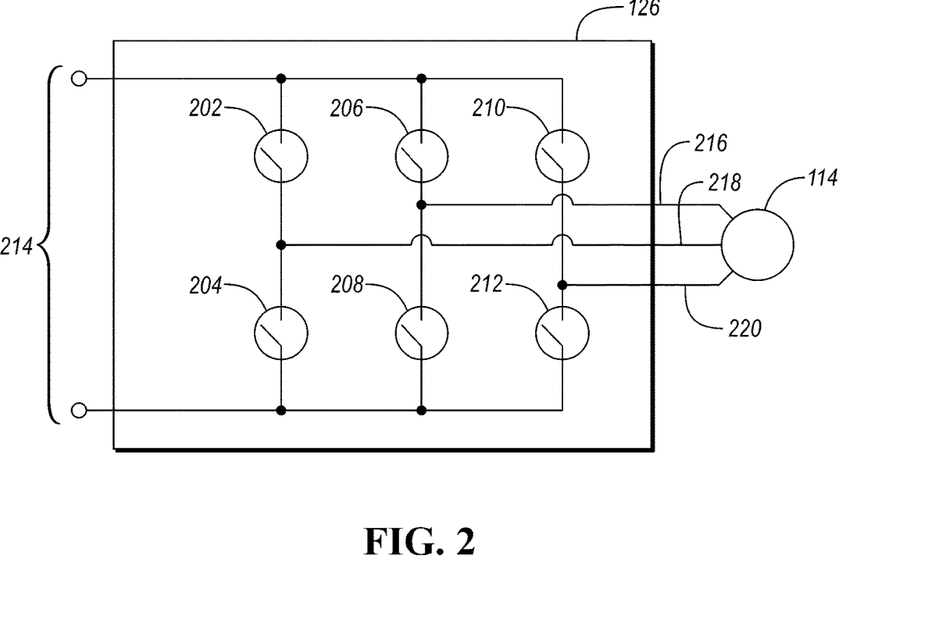
FIG. 2 is a diagram of a power inverter for an electric machine.

The electric machine 114 may be a three-phase AC machine. The electric machine 114 may have three phase inputs. The power electronics module 126 may be configured to provide the three-phase voltages/currents to the electric machine. FIG. 2 depicts a possible configuration of a traction inverter in the power electronics module 126. The power electronics module 126 may be configured to selectively couple voltage from a high-voltage DC bus 214 to each of the phase inputs of the electric machine 114. A first power switching module 202 may be configured to selectively couple a DC bus power terminal to a first phase input 218. A second power switching module 204 may selectively couple a DC bus return terminal to the first phase input 218. A third power switching module 206 may be configured to selectively couple a DC bus power terminal to a second phase input 216. A fourth power switching module 208 may selectively couple a DC bus return terminal to the second phase input 216. A fifth power switching module 210 may be configured to selectively couple a DC bus power terminal to a third phase input 220. A sixth power switching module 212 may selectively couple a DC bus return terminal to the third phase input 220.

The power switching modules may be comprised of one or more power switching devices. For example, the power switching devices may be Insulated Gate Bipolar Transistors (IGBT), Metal Oxide Semiconductor Field Effect Transistors (MOSFET), or other solid-state switching devices. Each of the power switching modules may have an associated control input (e.g., gate input) for controlling operation of the power switching module. The control inputs may be electrically coupled to a controller that is configured to operate the power switching modules. It is realized that each of the phase inputs of the electric machine 114 are selectively coupled to each terminal of the high-voltage DC bus 214 or traction battery terminals by a pair of power switching modules. The power switching modules may be operated such that only one of the pair of power switching modules coupled to a phase input is switched on at a given time. In some configuration, a diode may be coupled across the power switching modules.

The power switching devices may include two terminals that handle the high-power current through the power switching device. For example, an IGBT includes a collector (C) terminal and an emitter (E) terminal and a MOSFET includes a drain terminal (D) and a source (S) terminal. The power switching devices may further include one or more control inputs. For example, the power switching device may include a gate terminal (G) and a Kelvin source/emitter (K) terminal. The G and K terminals may comprise a gate loop to control the power switching device. The power switching devices may further include an integrated or on-chip current sensor. The integrated current sensor may be a semiconductor cell coupled in parallel with the power switching device. The source/emitter signal of the integrated current sensor may be coupled to a current sense terminal (SS) of the power switching device. The current sense terminal may provide a signal indicative of the current flowing through the power switching device.

The power switching modules may be configured to flow a rated current and have an associated power rating. Some applications may demand higher power and/or current ratings for proper operation of the electric machine 114. The power switching modules may be designed to include a power switching device that can handle the desired power/current rating. The desired power/current rating may also be achieved by using power switching devices that are electrically coupled in parallel. Power switching devices may be electrically coupled in parallel and controlled with a common control signal so that each power switching device flows a portion of the total current flowing to/from the load. Paralleling the switching devices may allow the power module to be designed with existing components without the need for a higher rated power switching device.

Issues may arise in applications in which power switching devices are controlled in parallel. Due to piece-to-piece variations of the power switching devices and non-uniform circuit layout, junction capacitances and circuit stray inductances may not be the same in each circuit path. As a result, switching transient currents of the paralleled power switching devices can be unbalanced and have different ringing frequencies and amplitudes. A circulating current between the paralleled power switching devices may be generated. Due to the power switching device junction capacitance and circuit stray inductances, an oscillating circulating current may arise in the gate circuit of the power switching devices. The oscillating current in the gate path causes the junction capacitance to charge and discharge resulting in an oscillating gate voltage. The gate input of the power switching device may be configured to withstand a predetermined voltage. Gate voltages in excess of the predetermined voltage may degrade the power switching device. Power switching devices capable of faster switching speeds (e.g., Silicon Carbide MOSFET) may be more sensitive to the unbalanced junction capacitance and circuit stray inductance during paralleled operation. One solution is to decrease the switching speed which leads to higher switching losses. A preferred way may be to reduce the oscillations is to ensure that the gate voltage stays below the predetermined voltage.

Figure 3:
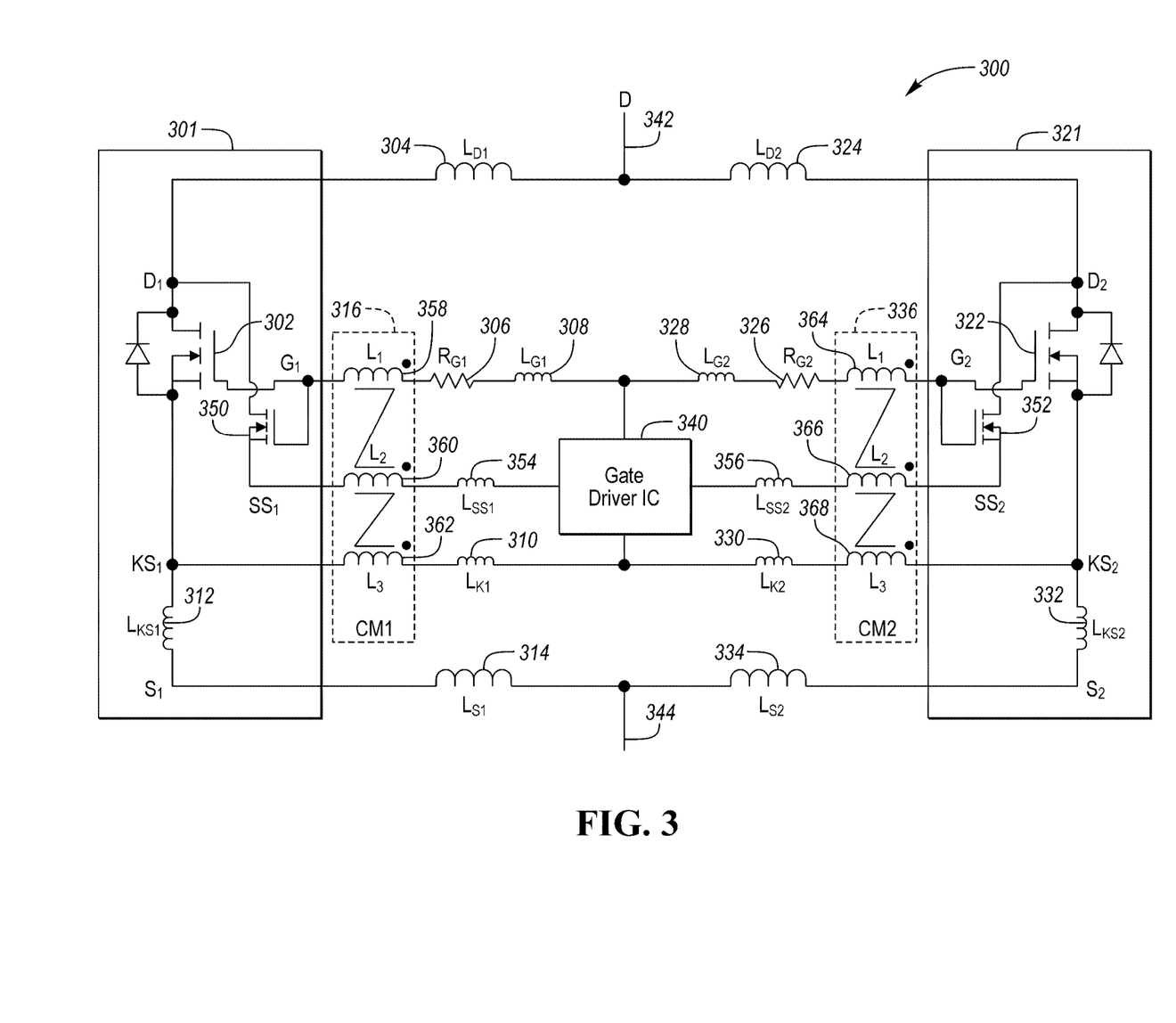
FIG. 3 is a schematic of a gate drive circuit for paralleled power switching devices

To eliminate or reduce the gate voltage oscillation that may occur in paralleled power switching devices, the gate loop impedance must be large enough to damp the oscillation current. However, a larger impedance in the gate loop reduces the gate current during switching transients which leads to reduced switching speeds and higher switching losses. FIG. 3 depicts a circuit diagram of a power module 300 having paralleled power switching devices (e.g., MOSFETs) with a common mode choke in the gate paths including the current sense terminal. The power module 300 may include a first power switching device 301 and a second power switching device 321. The power module 300 may have drain terminal 342 and a source terminal 344 for connecting to external circuits. The drain terminal 342 (or collector terminal for other technologies) and the source terminal 344 (or emitter terminal for other technologies) may be capable of conducting high currents as may be used for operating an electric machine.

The first power switching device 301 may include a first power switching element 302. The second power switching device 321 may include a second power switching element 322. Drain terminals of the first power switching element 302 and the second power switching element 322 may be electrically coupled to the drain terminal 342. The coupling for the first power switching device 301 may be characterized by a first drain stray inductance ($L_{D1}$) 304. The coupling for the second power switching device 321 may be characterized by a second drain stray inductance ($L_{D2}$) 324. In the example depicted, the power switching devices are MOSFETs. In a configuration in which the power switching devices are IGBTs, the collector (C) and emitter (E) terminals may be interchanged with the drain (D) and the source (S) terminals respectively.

Source terminals of the first power switching element 302 and the second power switching element 322 may be electrically coupled to the source terminal 344. The coupling for the first power switching device 301 may be characterized by a first source stray inductance ($L_{S1}$) 314. The coupling for the second power switching device 321 may be characterized by a second source stray inductance ($L_{S2}$) 334.

Gate terminals of the first power switching element 302 and the second power switching element 322 may be electrically coupled to a gate driver circuit 340. The coupling for the first power switching device 301 may be characterized by a first gate stray inductance ($L_{G1}$) 308 and first gate resistance ($R_{G1}$ 306). The coupling for the second power switching device 321 may be characterized by a second gate stray inductance ($L_{G2}$) 328 and second gate resistance ($R_{G2}$) 326. The gate driver circuit 340 may be an integrated circuit that is configured to provide proper gate signals for the power switching devices. The gate driver circuit 340 may ensure that proper voltage and current levels are applied to the gate inputs. The gate driver circuit 340 may be integrated with the power module 300 or may reside in an external printed circuit board (PCB). The gate driver circuit 340 may provide a common gate signal to the gate terminals of each of the power switching devices.

Kelvin source\emitter terminals of the first power switching element 302 and the second power switching element 322 may be electrically coupled to the gate driver circuit 340. The coupling for the first power switching device 301 may be characterized by a first Kelvin source stray inductance ($L_{K1}$) 310. The coupling for the second power switching device 321 may be characterized by a second Kelvin source stray inductance ($L_{K2}$) 330.

The first power switching device 301 may be further characterized by a first Kelvin source to source stray inductance ($L_{KS1}$) 312 that is the inductance between the Kelvin source terminal and the source terminal. The second power switching device 321 may be further characterized by a second Kelvin source to source stray inductance ($L_{KS2}$) 332 that is the inductance between the Kelvin source terminal and the source terminal. Not shown, are the junction capacitances between each of the terminals of the first and second power switching devices (301, 321).

The first power switching device 301 may include a first current sensing cell 350 that is coupled in parallel with the first power switching element 302. The first current sensing cell 350 and the first power switching element 302 may be driven by the same gate signal. The current flowing through the first current sensing cell 350 may be 1/n of the current flowing through the first power switching element 302. For example, the first power switching element 302 may be comprised of n−1 switching cells coupled in parallel. The first current sensing cell 350 may be a similarly configured switching cell. The source/emitter of the first current sensing cell 350 may be coupled to a first current sense terminal of the first power switching device 301. The first current sense terminal may be coupled to the gate driver circuit 340. The coupling may be characterized by a first current sense stray inductance ($L_{ss1}$) 354. In some configurations, the first current sense terminal and the Kelvin source/emitter terminal of the first power switching device 301 may be electrically coupled.

The second power switching device 321 may include a second current sensing cell 352 that is coupled in parallel with the second power switching element 322. The second current sensing cell 352 and the second power switching element 322 may be driven by the same gate signal. The current flowing through the second current sensing cell 352 may be 1/n of the current flowing through the second power switching element 322. For example, the second power switching element 322 may be comprised of n−1 switching cells coupled in parallel. The second current sensing cell 352 may be a similarly configured switching cell. The source/emitter of the second current sensing cell 352 may be coupled to a second current sense terminal of the second power switching device 321. The second current sense terminal may be coupled to the gate driver circuit 340. The coupling may be characterized by a second current sense stray inductance ($L_{ss2}$) 356. In some configurations, the second current sense terminal and the Kelvin source/emitter terminal of the second power switching device 321 may be electrically coupled.

The first and second current sense terminals may be used to provide a measurement of the current flowing through the associated power switching element (e.g., 302, 322). The feedback signal may be provided to a low-power control circuit for various uses, such as over-current protection.

During unbalanced operation, the gate voltages on each of the power switching modules may be different and oscillate. The gate voltages may be measured as the voltage between the gate terminal and the associated Kelvin source/emitter terminal. In some cases, the voltage oscillation may greatly exceed the normal turn-on gate voltage (e.g., 20 Volts). The power switching modules may be capable of sustaining a predetermined maximum gate voltage. Sustained gate voltage beyond the predetermined maximum gate voltage may result in reduced operating life of the device. Power switching modules capable of fast switching speeds (e.g., SiC MOSFET) may be sensitive to unbalanced junction capacitance and loop stray inductance during paralleled operation. The same oscillations may result in an oscillating gate to current sense terminal voltage. As the current sensing cell may have a lower junction capacitance than the main power switching device, the current sensing cell may degrade before the main power switching cells.

The power module 300 may further include a first common mode choke (CM1) 316 that magnetically couples the gate path, the current-sense path, and the Kelvin source path of the first power switching device 301. A first winding 358 may be coupled in the gate path. The gate path may be that portion of a circuit between the gate driver circuit 340 and the gate terminal of the first power switching device 301. A second winding 360 may be coupled in the current sense path. The current sense path may be that portion of a circuit between the gate drive circuit 340 and the current sense terminal of the first power switching device 301. A third winding 362 may be coupled in the Kelvin source/emitter path of the first power switching device 301. The Kelvin source/emitter path may be that portion of a circuit between the gate drive circuit 340 and the Kelvin source/emitter terminal of the first power switching device 301. The number of turns for the first winding 358, the second winding 360, and the third winding 362 may be the same such that each winding has equal inductance. The direction of coupling may be as shown in FIG. 3.

The power module may further include a second common mode choke (CM2) 336 that magnetically couples the gate path, the current-sense path, and the Kelvin source path of the second power switching device 321. A fourth winding 364 may be coupled in the gate path. The gate path may be that portion of a circuit between the gate driver circuit 340 and the gate terminal of the second power switching device 321. A fifth winding 366 may be coupled in the current sense path. The current sense path may be that portion of a circuit between the gate drive circuit 340 and the current sense terminal of the second power switching device 321. A sixth winding 368 may be coupled in the Kelvin source/emitter path of the second power switching device 321. The Kelvin source/emitter path may be that portion of a circuit between the gate drive circuit 340 and the Kelvin source/emitter terminal of the second power switching device 321. The number of turns for the fourth winding 364, the fifth winding 366, and the sixth winding 368 may be the same such that each winding has equal inductance. The direction of coupling may be as shown in FIG. 3.

When the voltage potential between the Kelvin source/emitter terminals of the power switching devices is different, most of the voltage drop will be across the third winding 362 and the sixth winding 368 rather than across the first Kelvin source stray inductance ($L_{K1}$) 310 and the second Kelvin source stray inductance ($L_{K2}$) 330. The reason for this is that the inductance value of the third winding 362 and the sixth winding 368 may be selected to be much larger than the inductance values of the first Kelvin source stray inductance ($L_{K1}$) 310 and the second Kelvin source stray inductance ($L_{K2}$) 330. The voltage across the third winding 362 may be inductively coupled to the first winding 358 and the second winding 360. The voltage across the sixth winding 368 may be inductively coupled to the fourth winding 364 and the fifth winding 366. As a result, the potential difference between the Kelvin source/emitter terminals is not added to either gate path or current sense path and the gate voltage oscillations are greatly reduced. As the winding inductance value is increased, the peak voltage of the gate voltage oscillation may decrease. The common mode chokes may be configured such that a voltage drop across one of the magnetically coupled windings induces an equivalent voltage drop across the other magnetically coupled windings.

Figure 4:
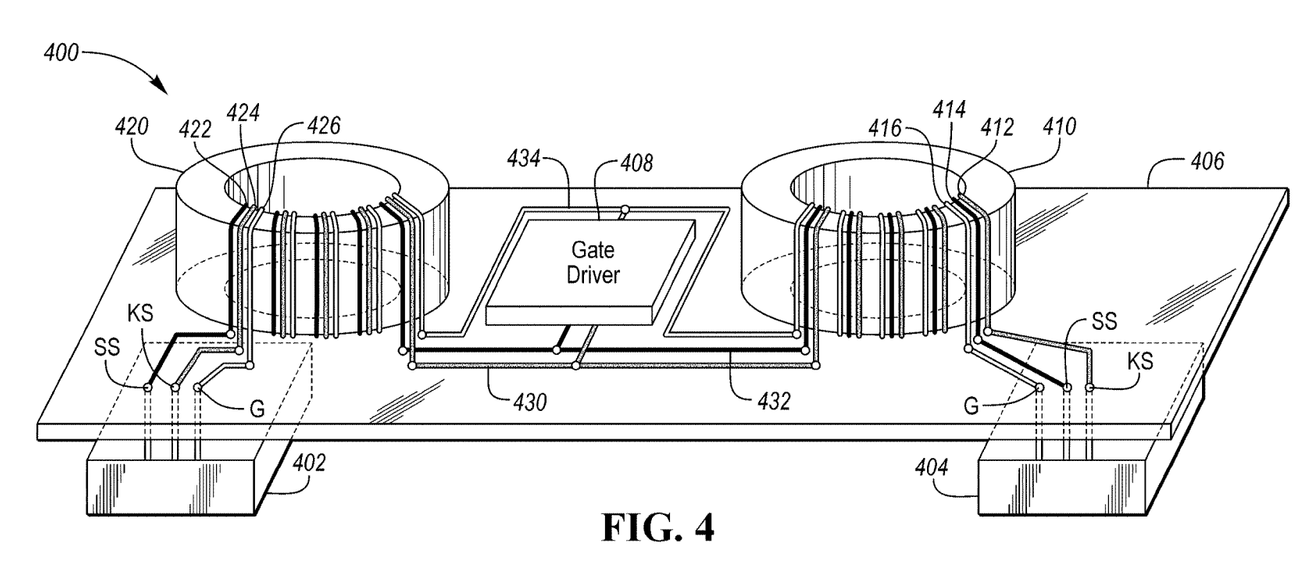
FIG. 4 is a possible configuration for paralleling power switching devices using coupled coils.

FIG. 4 depicts a possible configuration for implementing the common mode chokes. A first power module assembly 400 may include a first power switching device 404 and a second power switching device 402. The power switching devices may be MOSFET, IGBT, or other solid-state devices. The first power module assembly 400 may include a printed circuit board (PCB) 406. The PCB 406 may be a multi-layer PCB with traces formed in multiple layers and or surfaces. A gate driver circuit 408 may be mounted to or implemented on the PCB 406. The gate driver circuit 408 may include one or more integrated or discrete components that implement a gate drive function. The PCB 406 may include traces for connecting discrete components and the gate driver circuit 408. The first power module assembly 400 may include a first toroidal core 410. The first power module assembly 400 may include a first winding 412, a second winding 414, and a third winding 416. The first winding 412, the second winding 414 and the third winding 416 may be wrapped around the first toroidal core 410 to form a first common mode choke. One end of the first winding 412 may be electrically coupled to the Kelvin source/emitter terminal of the first power switching device 404. One end of the second winding 414 may be electrically coupled to the current sensing terminal of the first power switching device 404. One end of the third winding 416 may be electrically coupled to the gate terminal of the first power switching device 404.

The first power module assembly 400 may include a second toroidal core 420. The first power module assembly 400 may include a fourth winding 422, a fifth winding 424, and a sixth winding 426. The fourth winding 422, the fifth winding 424 and the sixth winding 426 may be wrapped around the second toroidal core 420 to form a second common mode choke. One end of the fourth winding 422 may be electrically coupled to the current sensing terminal of the second power switching device 402. One end of the fifth winding 424 may be electrically coupled to the Kelvin source/emitter terminal of the second power switching device 402. One end of the sixth winding 426 may be electrically coupled to the gate terminal of the second power switching device 402.

The PCB 406 may include a first trace 430 for connecting the other end of the first winding 412 and the fifth winding 424 to the gate driver circuit 408. The PCB 406 may include a second trace 432 for connecting the other end of the second winding 414 and the fourth winding 422 to the gate driver circuit 408. The PCB 406 may include a third trace 434 for connecting the other end of the third winding 416 and the sixth winding 426 to the gate driver circuit 408.

The gate driver circuit 408 may be configured to receive an external gate signal and output a common gate signal to drive each of the power switching devices. The PCB 406 may include a trace and/or terminal for coupling to the external gate signal. The PCB 406 may include additional power module structures to handle additional power switching devices. For example, an inverter may include a number of paralleled power switching devices for operating an electric machine. The structure depicted in FIG. 4 may be repeated on a common PCB to implement the inverter.

Figure 5:
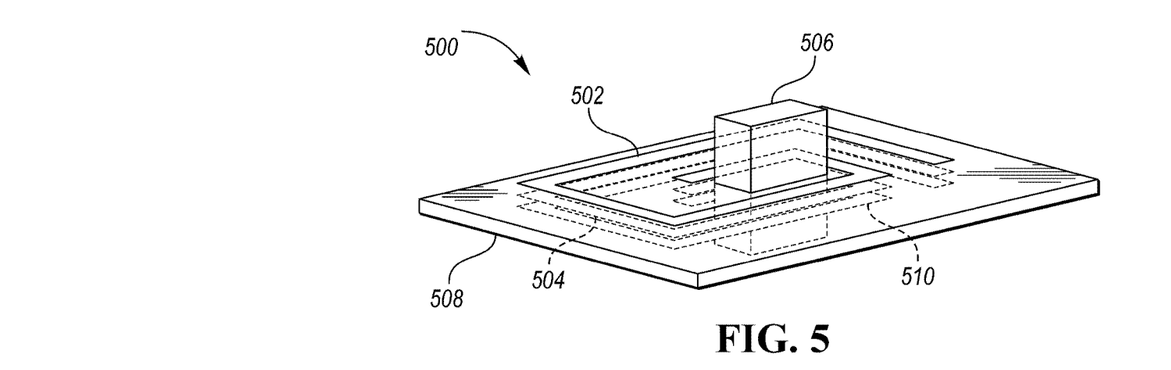
FIG. 5 is a possible configuration for coupled coils used for a power module.

FIG. 5 depicts a possible configuration for a gate loop common-mode (CM) choke 500. The CM choke 500 may include a first coil 502, a second coil 504, and a third coil 510. The first coil 502, the second coil 504, and the third coil 510 may formed of copper wires. The coils may be formed as copper traces in a PCB or substrate material 508. The substrate material 508 may be comprised of multiple layers. For example, the coils may be formed or etched onto one or more surfaces or planes of the substrate material 508. The first coil 502, the second coil 504, and the third coil 510 may be in different planes or may be in the same plane of the substrate material 508. When the first coil 502, the second coil 504, and the third coil 510 are implemented in different planes, the coil patterns may be the same except that each of the coils may extend to different lengths at each end to allow for connection. In addition, connection points may be provided on one or more of the surfaces to allow for connection to other circuit elements. When the first coil 502, the second coil 504, and the third coil 510 are implemented in the same plane, the coils may be arranged concentrically. That is, one coil may completely surround the others. The winding direction and the number of turns may be the same to form the CM choke 500. The CM choke 500 may include an optional core 506 that may be inserted at a central position defined by the coils to tune the $L_{CM}$ value. For example, larger $L_{CM}$ values may be achieved by inserting a core 506 within the coils.

The first coil 502, the second coil 504, and the third coil 510 may be comprised of wires which are insulated. For example, an electrical insulating material may be inserted between wires or the coil surface may be insulated. The wires may be attached to the substrate material 508. The coils may include terminals or connection points to facilitate electrical connections to other circuit elements. The first coil 502 may define a first terminal and a second terminal that are located at opposite ends of the first coil 502. The second coil 504 may define a third terminal and a fourth terminal located at opposite ends of the second coil 504. The third coil 514 may define a fifth terminal and a sixth terminal located at opposite ends of the third coil 510. The first terminal, the third terminal, and the fifth terminal may be configured so that the terminals are offset from one another. The second terminal, the fourth terminal, and the sixth terminal may be configured so that the terminals are offset from one another. This allows the connections to be exposed from at least one direction to facilitate connection with other components. The substrate material 508 may include additional traces to route the terminals of the coils to a convenient location for coupling to other circuit elements.

Figure 6:
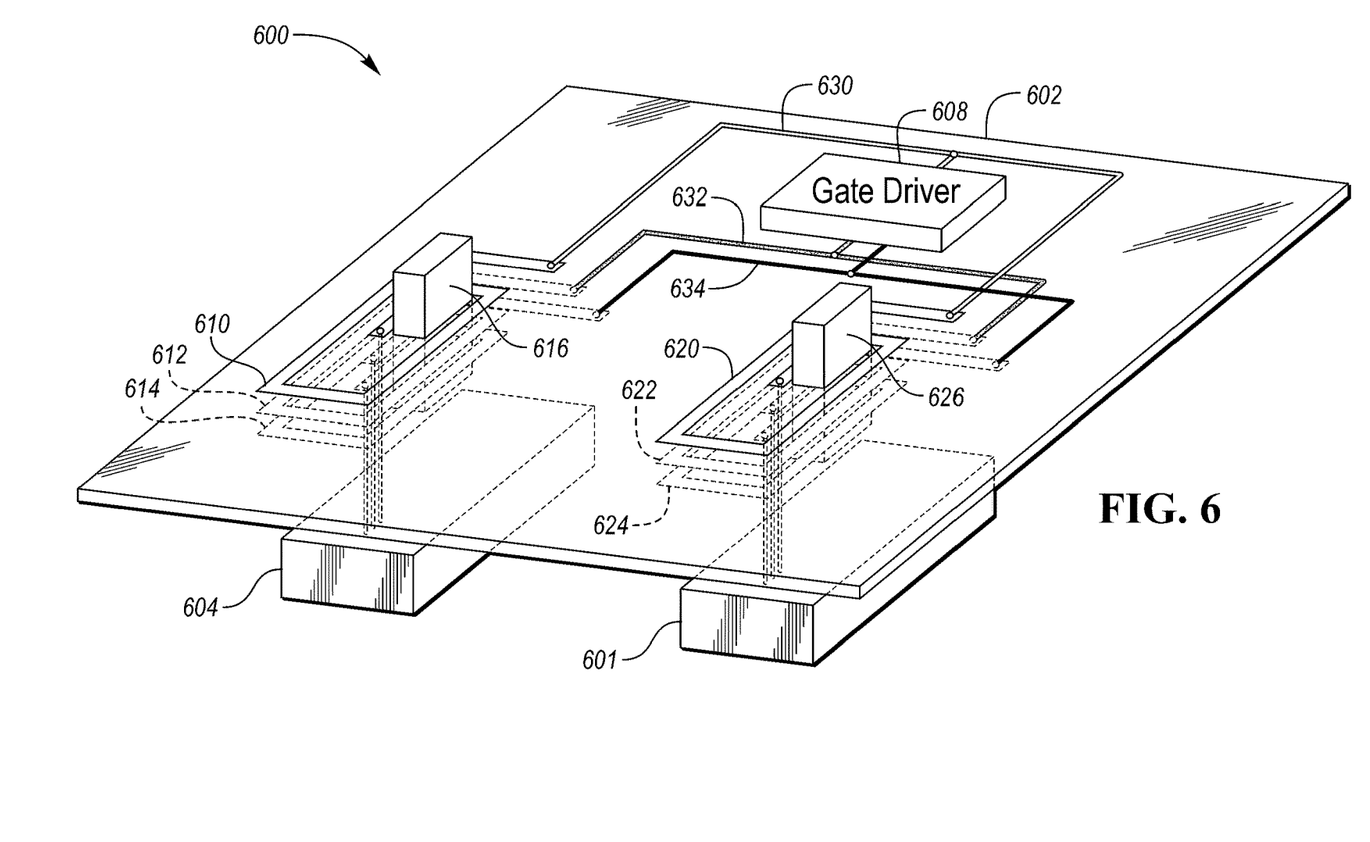
FIG. 6 is a another possible configuration for paralleling power switching devices using coupled coils.

FIG. 6 depicts a power module 600 that includes a pair of CM chokes similar to the CM choke 500 depicted in FIG. 5. The power module 600 may include a first power switching device 601 and a second power switching device 604 that are coupled to a substrate 602. The power module 600 may include a gate signal trace 630, a Kelvin source/emitter trace 632, and a current sense trace 634, each formed onto one or more surfaces or planes of the substrate 602. The power module 600 may include an external gate control terminal for providing a gate control signal. A gate driver circuit 608 may be mounted to the substrate 602 and may be have terminals, contacts, or pins that may be electrically connected to the traces formed on the substrate 602. The gate driver circuit 608 may include a combination of discrete and integrated components. The gate driver circuit 608 may be configured to receive an external gate signal and output a common gate signal for the paralleled power switching devices.

The power module 600 may include magnetically coupled CM chokes with windings that are electrically coupled between each power switching device and the gate, current sense, and Kelvin source/emitter traces. One of the coils may be electrically coupled in the gate path to connect a gate input of the power switching device to a common gate signal. One of the coils may be electrically coupled in a Kelvin source/emitter path to connect a Kelvin source/emitter output of the switching device to a common control signal. One of the coils may be electrically coupled in a current sense path to connect a current sense output of the switching device to a current sense trace.

A gate input of the first power switching device 601 may be electrically coupled to a first connection of a first CM choke coil 620. A Kelvin source/emitter terminal of the first power switching device 601 may be electrically coupled to a first connection of a second CM choke coil 622. A current sense terminal of the first power switching device 601 may be electrically coupled to a first connection of a third CM choke coil 624. A second connection of the first CM choke coil 620 may be electrically coupled to the gate signal trace 630. A second connection of the second CM choke coil 622 may be electrically coupled to the Kelvin source/emitter trace 632. A second connection of the third CM choke coil 624 may be electrically coupled to the current sense trace 634.

A gate input of the second power switching device 604 may be electrically coupled to a first connection of a fourth CM choke coil 610. A Kelvin source/emitter terminal of the second power switching device 604 may be electrically coupled to a first connection of a fourth CM choke coil 612. A current sense terminal of the second power switching device 604 may be electrically coupled to a first connection of a sixth CM choke coil 614. A second connection of the fourth CM choke coil 610 may be electrically coupled to the gate signal trace 630. A second connection of the fifth CM choke coil 612 may be electrically coupled to the Kelvin source/emitter trace 632. A second connection of the sixth CM choke coil 614 may be electrically coupled to the current sense trace 634.

The power module 600 includes a CM choke magnetically coupling the three circuit paths for each power switching devices (e.g., 601, 604) that are paralleled. The example only depicts two power switching devices, but additional power switching devices may be paralleled in a similar manner using additional CM chokes. The power module 600 may be enclosed in a casing to protect the circuit and components. The power switching devices may be controlled by the external gate control terminal. The addition of the CM chokes prevents oscillations in the gate signals. The power module 600 may present a common control interface (gate, Kelvin source/emitter, and current sense terminals) to the external environment. By integrating the CM chokes into the power module 600, gate voltage oscillations can be reduced or eliminated. The external circuitry may interface with the power module 600 in the same manner regardless of how many paralleled power switching devices are integrated into the power module 600.

Note that the power module 600 may include any number of power switching devices. For example, for a motor inverter, six pairs of paralleled switching devices may be used to control the phase currents of the motor. The substrate 602 may be sized to include an interface to six pairs of paralleled power switching devices. Each paralleled pair of power switching devices may implement a structure as depicted in FIG. 6.

The control interface of the configuration of FIG. 6 may include an external gate control terminal, an external current sense terminal, and an external Kelvin source/emitter terminal. The external gate control terminal, external current sense terminal, and the external Kelvin source/emitter terminal may be connected respectively to the common gate signal trace 630, the common current sense trace 634, and the common Kelvin source/emitter trace 632. In other configurations, the gate driver circuit 608 may be external to the substrate 602 and each of the power switching devices (e.g., 601, 604) may be coupled to separate external gate control terminals, external current sense terminals, and Kelvin source/emitter terminals. That is, the external interface to the power module may a gate control terminal, a current sense terminal, and a Kelvin source/emitter terminal for each power switching device that is included in the power module. A connection between the gate control terminals, the current sense terminals, and the Kelvin source/emitter terminals may be made external to the power module.

Figure 7:
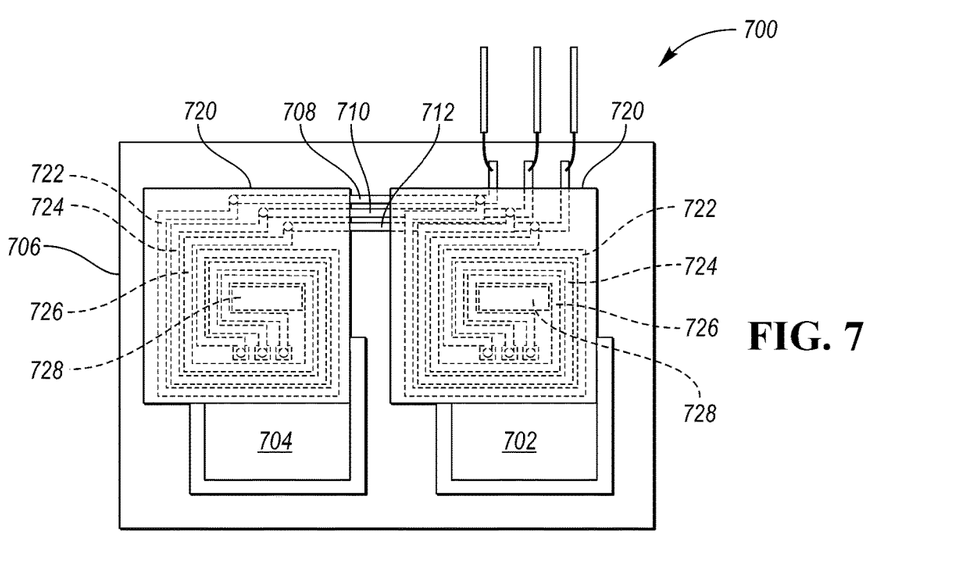
FIG. 7 is a possible configuration for a power module with paralleled switching devices and a common mode choke implemented on a circuit board.

FIG. 7 depicts a power module 700 that includes a first power switching device 702 and a second power switching device 704. The power module 700 may include a substrate 706. The first power switching device 702 and the second power switching device 704 may be coupled or bonded to the substrate 706. The substrate 706 may include a gate signal trace 708, a Kelvin source/emitter trace 710, and a current sense trace 712. The gate signal trace 708, the Kelvin source/emitter trace 710, and the current sense trace 712 may be copper traces that are etched into or attached to the substrate 706. The power module 700 may include an external gate control terminal, an external Kelvin source/emitter terminal, and an external current sense terminal. The external terminals may be electrically coupled to an external gate drive circuit. The external gate control terminal may be coupled to the gate signal trace 708 via a first wirebond connection. The external Kelvin source/emitter terminal may be coupled to the Kelvin source/emitter trace 710 via a second wirebond connection. The external current sense terminal may be coupled to the current sense trace 712 via a third wirebond connection.

The power module 700 may include one or more choke substrates 720 which may be realized as one or more PCBs. A first coil 722, a second coil 724, and a third coil 726 may be formed on one or more layers of the choke substrate 720. The first coil 722, the second coil 724, and the third coil 726 may form concentric coils around a central portion that may include a magnetic core 728. The common mode choke may be formed as a plurality of concentric traces on the choke substrate 720 around a common axis. For example, the first coil 722, the second coil 724, and the third coil 726 may be formed on a common layer of the choke substrate 720. Ends of the first coil 722, the second coil 724, and the third coil 726 may include connection points for electrically coupling the coils to the power switching device terminals and the traces of the substrate 706. The power module 700 may include a separate choke substrate 720 and associated coils for each of the power switching devices. In some configurations, multiple sets of coils may be implemented on a single substrate.

The gate connection of the first power switching device 702 may be electrically coupled to the gate signal trace 708 through the first coil 722 of the associated CM choke. The Kelvin source/emitter connection of the first power switching device 702 may be electrically coupled to the Kelvin source/emitter trace 710 through the second coil 724 of the associated CM choke. The current sense connection of the first power switching device 702 may be electrically coupled to the current sense trace 712 via the third coil 726 of the associated CM choke. The gate connection of the second power switching device 704 may be electrically coupled to the gate signal trace 708 through the first coil 722 of the associated CM choke. The Kelvin source/emitter connection of the second power switching device 704 may be electrically coupled to the Kelvin source/emitter trace 710 through the second coil 724 of the associated CM choke. The current sense connection of the second power switching device 704 may be electrically coupled to the current sense trace 712 via the third coil 726 of the associated CM choke. The power module 700 may be enclosed in a case so that a single, integrated component is defined.

In some configurations, the choke substrate 720 may be a multi-layer PCB. The first coil 722, the second coil 724, and the third coil 726 may be implemented as traces in different planes or surfaces of the choke substrate 720. The choke substrate 720 may be attached to the substrate 706.

Figure 8:
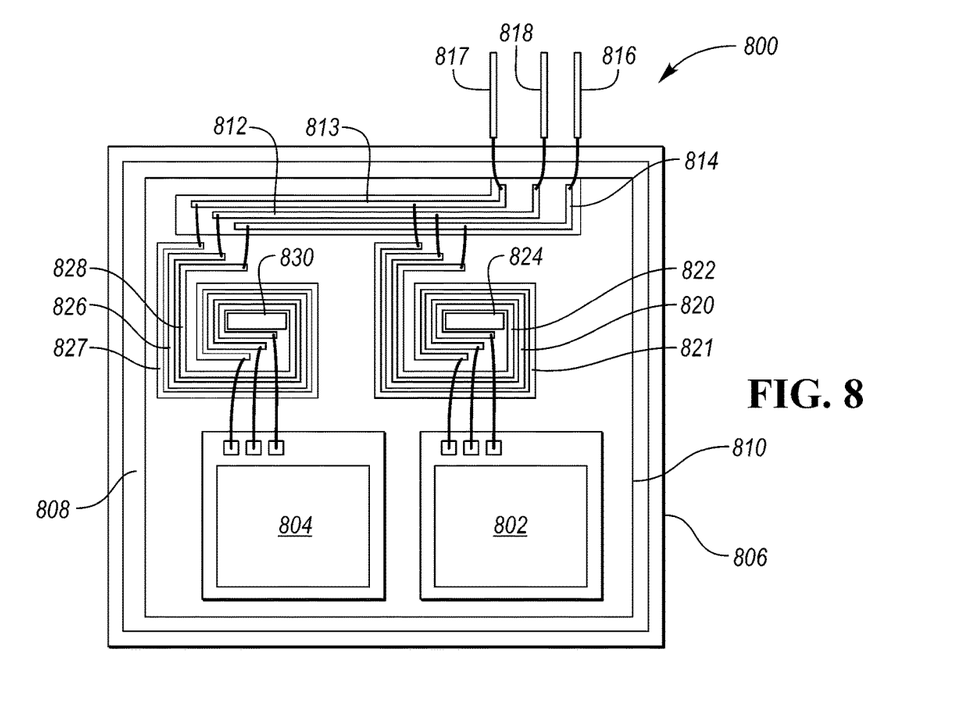
FIG. 8 is a possible configuration for a power module with paralleled switching devices and a common mode choke implemented by substrate traces.

The power modules may be integrated with direct bonded copper (DBC) substrates. FIG. 8 depicts a possible power module 800 based on a DBC structure. The power module 800 may include CM chokes in the gate, current sense, and Kelvin source/emitter paths of each of the paralleled power switching devices. The CM chokes may be implemented as an integral part of the DBC structure. The power module 800 may include a bottom-most copper layer 806. Directly above the bottom-most copper layer 806 may be a ceramic layer 808. Coupled to the ceramic layer may be a power/signal copper layer 810. A first power switching device 802 and a second power switching device 804 may be coupled to the power/signal copper layer 810.

The power/signal copper layer 810 may include a gate signal trace 813, a current sense trace 812, and a Kelvin source/emitter trace 814 that may be etched or otherwise formed in the power/signal copper layer 810. CM chokes may be defined by etching coils into the power/signal copper layer 810. For example, a first outer coil 821, a first middle coil, 820, and a first inner coil 822 may be etched into or otherwise formed in the power/signal copper layer 810. The first outer coil 821 may be electrically coupled at a first end to the gate signal trace 813 and at a second end to a gate terminal of the first power switching device 802. The first inner coil 822 may be electrically coupled at a first end to the Kelvin source/emitter trace 814 and at a second end to a Kelvin source/emitter terminal of the first power switching device 802. The first middle coil 820 may be electrically coupled at a first end to the current sense trace 812 and at a second end to a current sense terminal of the first power switching device 802. The electrical couplings may be via wirebond connections. The electrical couplings may also be achieved by additional traces routed between the connections. The first outer coil 821, the first middle coil 820, and the first inner coil 822 may be defined such that traces defining the coils are isolated from one another. The coils may be formed in a square/rectangular pattern. The coils may also be formed in a circular pattern. An optional first core 824 may be inserted at a central position defined by the first outer coil 821, the first middle coil 820, and the first inner coil 822 to achieve a desired $L_{CM}$ value.

A second outer coil 827, a second middle coil 826, and a second inner coil 828 may be etched into the power/signal copper layer 810. The second outer coil 827 may be electrically coupled at a first end to the gate signal trace 813 and at a second end to a gate terminal of the second power switching device 804. The second inner coil 828 may be electrically coupled at a first end to the Kelvin source/emitter trace 814 and at a second end to a Kelvin source/emitter terminal of the second power switching device 804. The second middle coil 826 may be electrically coupled at a first end to the current sense trace 812 and at a second end to a current sense terminal of the second power switching device 804. The electrical couplings may be via wirebond connections. The electrical couplings may also be achieved by additional traces routed between the connections. An optional second core 830 may be inserted at a central position defined by the second outer coil 827, the second middle coil 826, and the second inner coil 828 to achieve a desired $L_{CM}$ value.

The power module 800 may include an external gate terminal 817, an external current sense terminal 818, and an external Kelvin source/emitter terminal 816 for interfacing with other circuits. For example, the external terminals may be connected to a gate driver circuit. The power module 800 may be enclosed in a case.

In some configurations, the power switching devices may not be combined in a single power module. Rather, individual power switching devices may be paralleled by external connections. Power connections of each power switching device may be connected via bus bars. Control terminals may be connected on a gate drive circuit board. A common mode choke may also be implemented for these configurations.

In any of the configurations, the CM choke may be configured such that a number of turns of each of the magnetically coupled windings are equal. An inductance of each of the magnetically coupled windings may be greater than a stray inductance in an associated connection.

The configurations may be applied to an inverter (power electronics module) to drive an electric machine in a vehicle. The inverter may include a plurality of switching devices triggered by a common gate signal and electrically coupled in parallel between an electric machine winding and a battery terminal and a common mode choke associated with each of the switching devices magnetically coupling a gate circuit, a current-sense circuit, and a Kelvin source/emitter circuit associated with the switching devices.

An advantage of adding the CM choke in the gate, current sense, and Kelvin source/emitters circuits is that oscillations are prevented that may cause excessive gate voltages. Further, by incorporating the choke with the current sense path, oscillations that may degrade the current sense circuitry are reduced. The benefit may be obtained without increasing switching transient time and switching loss associated with the power semiconductor. The gate drive loop has a small current so any extra losses caused by the CM choke are negligible. The CM chokes described herein may be implemented within the power module or on the gate drive board which provides opportunities for reducing cost. The implementations within the power module use existing structures and have limited impact on the power module structure and volume. The $L_{CM}$ value may be easily tuned during the design phase to achieve a desirable value. The addition of the CM chokes for each power semiconductor allows multiple power semiconductors to be paralleled without oscillations in the gate voltages.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power module comprising:
   a plurality of switching devices electrically coupled in parallel and triggered by a common gate signal, each including a gate terminal, a current-sense terminal, and a Kelvin source/emitter terminal; and
   a plurality of magnetically coupled windings coupling the gate terminal, the current-sense terminal and the Kelvin source/emitter terminal of each of the switching devices to a gate driver circuit.

2. The power module of claim 1 wherein a number of turns of each of the magnetically coupled windings are equal.

3. The power module of claim 1 wherein the current-sense terminal and the Kelvin source/emitter terminal are coupled together.

4. The power module of claim 1 wherein an inductance of each of the magnetically coupled windings is greater than a stray inductance in an associated connection.

5. The power module of claim 1 wherein a first of the magnetically coupled windings is electrically connected between the gate terminal and the gate driver circuit, a second of the magnetically coupled windings is electrically connected between the current-sense terminal and the gate driver circuit, and a third of the magnetically coupled windings is electrically connected between the Kelvin source/emitter terminal and the gate driver circuit.

6. The power module of claim 1 wherein a voltage drop across one of the magnetically coupled windings induces an equivalent voltage drop across remaining magnetically coupled windings.

7. A power module comprising:
   a plurality of switching devices triggered by a common gate signal, electrically coupled in parallel between an electric machine winding and a battery terminal, and attached to a substrate that includes first, second, and third traces formed around a common axis to define a common mode choke that magnetically couples a gate path, a current-sense path, and a Kelvin source/emitter path of each of the switching devices.

8. The power module of claim 7 wherein one of the first, second, and third traces forms a coil in the gate path that connects a gate input of the switching devices to the common gate signal.

9. The power module of claim 7 wherein one of the first, second, and third traces forms a coil in the Kelvin source/emitter path that connects a Kelvin source/emitter output of the switching devices to a common control signal.

10. The power module of claim 7 wherein one of the first, second, and third traces forms a coil in the current-sense path that connects a current-sense output of the switching devices to a common control signal.

11. The power module of claim 7 wherein a number of turns of the first, second, and third traces is equal.

12. The power module of claim 7 further comprising a magnetic core inserted at a central position defined by the first, second, and third traces.

13. The power module of claim 7 wherein the first, second, and third traces are formed as copper traces on respective planes of the substrate.

14. The power module of claim 7 wherein the first, second, and third traces are formed in a same layer of the substrate.

15. The power module of claim 7 wherein the first, second, and third traces are formed in different layers of the substrate.

16. A vehicle comprising:

an electric machine; and an inverter comprising a plurality of switching devices triggered by a common gate signal and electrically coupled in parallel between an electric machine winding and a battery terminal, and a common mode choke associated with each of the switching devices magnetically coupling a gate circuit, a current-sense circuit, and a Kelvin source/emitter circuit associated with the switching devices.

17. The vehicle of claim 16 wherein inductances associated with each coil of the common mode choke have an equivalent inductance value.

18. The vehicle of claim 16 wherein the common mode choke is configured such that a voltage drop across a winding of the common mode choke induces an equivalent voltage drop across other windings of the common mode choke.

19. The vehicle of claim 16 wherein the common mode choke is formed as a plurality of concentric traces on a substrate around a common axis.

20. The vehicle of claim 16 wherein the common mode choke is formed as a plurality of traces, each formed around a common axis on a different layer of a substrate.

* * * * *